United States Patent
Broz

(10) Patent No.: US 6,749,879 B2
(45) Date of Patent: Jun. 15, 2004

(54) LOW-CALORIE, CARBONATED FROZEN BEVERAGE CONCENTRATE

(75) Inventor: Richard Broz, Hawthorn Woods, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 225 days.

(21) Appl. No.: 10/121,649

(22) Filed: Apr. 12, 2002

(65) Prior Publication Data

US 2002/0197376 A1 Dec. 26, 2002

Related U.S. Application Data

(60) Provisional application No. 60/283,395, filed on Apr. 12, 2001.

(51) Int. Cl.⁷ .................................................. A23G 9/00
(52) U.S. Cl. ........................ 426/565; 426/569; 426/590; 426/515; 426/524
(58) Field of Search ................................ 426/565, 569, 426/515; 424/524

(56) References Cited

U.S. PATENT DOCUMENTS

| | | | | |
|---|---|---|---|---|
| 4,039,693 A | * | 8/1977 | Adams et al. ............... | 426/565 |
| 5,486,372 A | * | 1/1996 | Martin et al. ................ | 426/565 |
| 6,010,734 A | * | 1/2000 | Whelan et al. ............. | 426/565 |
| 6,468,576 B1 | * | 10/2002 | Sher et al. ................... | 426/565 |

FOREIGN PATENT DOCUMENTS

EP  1 133 923 A1  *  9/2001

* cited by examiner

*Primary Examiner*—N. Bhat
(74) *Attorney, Agent, or Firm*—Thaddius J. Carvis; Thomas A. Marcoux

(57) ABSTRACT

A beverage concentrate is prepared for mixing with carbonated water and whipping to an overrun of about 100%. The beverage concentrate compositions of the invention enable the preparation of low-calorie beverages of less than 100 calories per 12 ounce serving. In a preferred form the concentrate for dilution with carbonated water, freezing and whipping comprises: water; a polyol, flavor, acidulent, buffering salts, and high-intensity sweetener. Despite having very little solids and no sugar, they can be diluted and still have a suitably depressed freezing point of from about 24 to 26° F., e.g., 25° F.

20 Claims, No Drawings

LOW-CALORIE, CARBONATED FROZEN BEVERAGE CONCENTRATE

This appln. Claims benefit of 60/283,395, filed on Apr. 12, 2001.

BACKGROUND OF THE INVENTION

The invention relates to an improved low-calorie, carbonated frozen beverage concentrate which can be processed into a finished beverage of high overrun on conventional processing equipment. In particular, the invention provides an improved beverage of this type which has a desirable slush-type texture and a flavor profile which is highly satisfying despite the need for adjustments to the formula which go beyond those necessary to simply provide a low-calorie beverage.

Slush-type frozen beverages have been popular for years and are now made principally by automated equipment which mixes a concentrate with water or carbonated water and freezes and aerates the mixture to a slush consistency—i.e., a slurry of ice crystals in a liquid beverage phase. Typical of the equipment suitable for this purpose are those available from IMI Cornelius, Inc. To be functional, beverage concentrate compositions must have the ability to be processed without over freezing and to be whipped to an overrun of about 100% by volume. These machines are controlled and calibrated for proper operation with sugar-containing concentrates. Thus, they cannot function properly, if at all, using concentrates having very little solids and no sugar. Such compositions would freeze too soon and well above the target of about 25° F. Serious operational problems, as well as inferior product quality, could result.

Given these limitations, the preparation of low-calorie beverages of less than 100 calories per 12 ounce serving by volume, preferably less than about 60 calories, presents a considerable technical challenge. The achievement of this result while providing a very pleasing flavor is an even greater challenge. The removal of sugar and other caloric ingredients to reduce calories is accompanied by a reduction in solids and changes in texture and flavor as well as freezing characteristics.

There remains a need for an improved low-calorie, carbonated frozen beverage concentrate which can be processed into a finished beverage of high overrun on conventional processing equipment.

SUMMARY OF THE INVENTION

It is an object of the invention to provide an improved low-calorie, carbonated frozen beverage concentrate, which can be processed into a finished beverage of high overrun on conventional processing equipment.

It is another object of the invention to provide an improved beverage of this type, which has a desirable slush-type texture and a flavor profile which is highly satisfying despite the need for adjustments to the formula that go beyond those necessary to simply provide a low-calorie beverage.

It is yet another object of the invention to provide an improved process for preparing slush-type frozen beverages utilizing the concentrate of the invention.

These and other objects are accomplished by the invention, which provides an improved low-calorie, carbonated frozen beverage concentrate, which can be processed into a finished beverage of high overrun on conventional processing equipment, the concentrate comprising:

water, a polyol, flavor, acidulent, buffering salts, and high-intensity sweetener.

According to a process aspect of the invention, a low-calorie whipped, frozen beverage is prepared by mixing a concentrate comprising water, a polyol, flavor, acidulent, buffering salts, and high-intensity sweetener, with water or carbonated water; freezing the mixture of water and concentrate; and whipping the mixture to prepare an aerated, frozen slush beverage.

The process has a number of preferred aspects, which are described below.

DETAILED DESCRIPTION OF THE INVENTION

While the invention has broader utility, the following description will detail one preferred form wherein a beverage concentrate is prepared for mixing with carbonated water and whipping to an overrun suitable for the beverage type and flavor employed. Various representative ingredients will be discussed below and can be employed in the relative amounts described or otherwise as is effective to achieve the objects of the invention.

As used herein, the term "frozen beverage" is meant to include beverages having a thick texture due to the presence of at least 25%, e.g., at least 50%, preferably from 70 to 90%, ice crystals suspended in a flavored liquid. The viscosity is slushy and is spoonable, yet drinkable. It is preferably thick enough in consistency to be stacked over the top of a serving container to give it a large, stable head.

The beverage concentrate compositions of the invention will enable the preparation of low-calorie beverages of less than 100 calories per 12 ounce serving (by volume). Typically, with an overrun, as achieved by conventional mixing and dispensing equipment as available from IMI Cornelius, Inc., of about 100% by volume, the calorie content will be less than about 60 calories per serving of this size. Calorie contents of from 40 to 55 calories per serving are desired in many cases. In some cases, calorie contents of as low as about 20 to 40 calories per serving are desired. Lower calorie contents are useful, but will typically affect various desired attributes of the final beverages or their ability to be processed. The overrun, if any, will greatly affect the calories per serving and is not limited to 100%, but will desirably be at least 50% and not over 150%.

An important factor in deciding on the relative amount of the various ingredients, other than flavor and calorie content, will be the ability to process on conventional equipment of the type described above. These machines are controlled and calibrated for proper operation with sugar-containing concentrates. Thus, they cannot function properly, if at all, using concentrates having very little solids and no sugar. It is an advantage of the invention, that compositions having as little as about 6% total solids when diluted can still have a suitably depressed freezing point of from about 24 to 26° F., e.g., 25° F. The ingredients of the beverage concentrates of the invention are therefore selected and utilized within the guidelines offered below to achieve the noted overrun, calorie and freezing point parameters noted above. The result is a beverage concentrate that surprisingly has a very pleasing flavor while still meeting the important functional criteria.

The pH of the beverages and beverage concentrates in syrups of the present invention is dependent upon the particular composition of the acid component, the total amount of acids used and the sourness impression desired. Typically, the pH can range from 1.5 to about 6 or more. Preferred fruity carbonated beverages have a pH of from about 1.75 to about 4.0. Other flavors not requiring the same tartness, e.g., coffee or tea drinks, will have higher pH values, such as within the range of from 4.5 to 6.5. Phosphoric acid is preferred where taste will permit its ability to control freezing point without adding calories. However, any of the suitable food acidulents can be employed, e.g., a member selected from the group consisting of adipic acid, citric acid, fumaric acid, lactic acid, malic acid (e.g., dl malic), tartaric acid, and mixtures of at least two of these. The terms "food acid" and "food acidulent" are used herein to mean carboxylic acids, such as those mentioned, which are useful for imparting a tart taste to foods. These acids are compatible with food acceptable inorganic acids such as phosphoric, hydrochloric, and the like.

An essential feature of the invention is the ability to obtain, in addition to balanced flavor and mouthfeel, a control of the freezing point and slush character when frozen. An important contributor to these properties is the total salt content. The specific salts are also important. It is desirable to add one or more buffering salts compatible with the acid and other ingredients. Suitable buffering salts can include one or more members selected from the group consisting of the alkaline earth and/or alkali metal salts of calcium, sodium and potassium salts of the listed food acids. Among the specific useful weak acid salts are sodium citrate, potassium citrate, disodium phosphate, dipostassium phosphate, monocalcium phosphate, tricalcium phosphate, and mixtures of at least two of these. The phosphate salts are preferred for most formulations due to their freezing point lowering effect, but the organic acid salts are useful for some formulations. The total salt content, including buffering salts and others will typically be within the range of from 1 to 10%, e.g., from 2 to 5%. The total salts and other soluble solids will be used in amounts effective to achieve the overrun and freezing characteristics noted above.

The beverages of the invention achieve their low calorie levels in significant part due to the elimination of sugar. To replace its sweetness, one or more intense sweeteners can be employed. Among these are sucralose, aspartame, acesulfame-K, saccharin, cyclamate, neohesperidin dihydrochalcone, thaumatin, altame, stevioside, glycyrrhzin, Lo Han Guo, and the like. Also, low-intensity, low-calorie sweeteners such as sorbitol and erythritol can be employed. These latter materials, as with other polyhydric alcohols, have a desirable freezing point lowering effect. Among the other suitable polyhydric alcohols are glycerol and propylene glycol. Typically, the beverage concentrate compositions will contain from about 20 to about 50% by weight of a combination of polyols, e.g., from about 25 to about 40% of polyols, with up to about 20%, e.g., from about 5 to about 10%, preferably comprising sorbitol. Water will comprise an amount sufficient to dissolve all of the ingredients in stable form for shipment. Typical water contents will be within the range of from 40 to 65%, e.g., at least about 50%, for the dilution ratios exemplified, with the amount of water in the concentrate being varied with the degree of dilution to form the final beverage.

The beverage concentrate compositions of the invention can also include additional functional ingredients, such as flavors, flavor enhancers, food-approved colors, vitamins, minerals, flow agents, etc. Typical of suitable colorants are any of those suitable for achieving the desired color. Included as representative are FD&C colors, and the like.

The flavor component of the beverages and beverage concentrates and syrups of the present invention is a natural or artificial flavor selected from fruit flavors, botanical flavors and mixtures thereof. Fruit and other flavors can be natural or synthetically prepared flavors made to simulate flavors derived from natural sources.

The flavors useful in the beverage concentrates are sometimes available as dry ingredients, liquids or emulsions. In any of these forms, they can be dispersed into the beverage concentrate. In addition to the active flavor itself, industrially available flavors can contain, weighting agents, emulsifiers, emulsion stabilizers, antioxidants, liquid vehicles, and the like.

The particular amount of the flavor component effective for imparting flavor characteristics to the beverages and beverage concentrates of the present invention will depend upon the flavor, the flavor impression and formula flavor component. For example, the flavor component can comprise at least 0.05% by weight of the beverage composition and typically from 0.1% to about 2% by weight of the beverage (on a single strength basis). In addition to fruity flavors, such as lemon, orange, lime, cherry, strawberry, raspberry, grape, grapefruit, and the like, the beverage concentrate compositions can contain a variety of other flavors, e.g. cola, root beer, coffee, tea, botanical flavors can include those flavors derived from nuts, bark, roots and leaves, and the like.

The flavor component can comprise a single flavor or blended flavors. For example, lime and lemon flavors, cola flavors with citrus flavors to form a "cola" and pineapple and orange flavors are preferred flavor blends.

To prepare a beverage mix composition, the dry ingredients are added to the water, warmed to about 60° to about 70° C., and mixed under high shear conditions, e.g., in a Lightnin® mixer, until a clear solution is obtained. If desired one or more of the dry ingredients can be premixed in a suitable dry blender, such as a V-blender or a ribbon mixer.

The liquid concentrate prepared in accordance with the above description, can be suitably packaged for storage and shipment. Representative of suitable containers are coated paperboard of the type used for milk cartons, coated metal cans, plastic bags supported within corrugated cardboard outer containers. The containers can have integral means such as pouring spouts or dispensing tubes, or the like.

The concentrates of the invention are preferably mixed with carbonated water in a suitable mixer of the type described, to achieve an overrun within the ranges noted. The preferred compositions will be formulated for mixing with from about 3 to 6 parts carbonated water on a volume basis, but can be mixed with noncarbonated water if desired. Preferred mix ratios will be about 5 parts of water to 1 of concentrate. The following table illustrates representative ingredients and proportions.

| Ingredient | % by Weight |
| --- | --- |
| Water | 35–55 |
| Glycerin | 15–30 |
| Sorbitol, 70% in water | 2–12 |
| Propylene Glycol | 2–12 |
| Food Acid | Less than 10 |
| Phosphoric Acid, 75% in water | Less than 5 |
| Mono Potassium Phosphate | Less than 5 |
| Mono Calcium Phosphate | Less than 5 |
| Gums and stabilizers | Less than 5 |
| Sodium Chloride | Less than 5 |
| Calcium Chloride | Less than 5 |
| Disodium Phosphate | Less than 5 |
| Flavorings | Less than 5 |
| Sodium Benzoate | Less than 2 |
| Potassium Sorbate | Less than 2 |
| FD&C Certified Colors | Less than 2 |
| Yucca Extract | Less than 2 |
| Calcium Disodium EDTA | Less than 2 |
| Sucralose, 25% in water | Less than 2 |
| Total | 100 |

The following Examples are provided to further illustrate and explain one preferred form of the invention and is not to be taken as limiting in any regard. Unless otherwise indicated, all parts and percentages are by weight.

EXAMPLE 1

This example presents one preferred embodiment of the invention wherein a lemonade beverage concentrate is prepared from the ingredients listed below by the procedures described above.

| Ingredient | % by Weight |
|---|---|
| Water | 46.9439 |
| Glycerin | 25.0559 |
| Sorbitol, 70% in water | 8.3498 |
| Phosphoric Acid, 75% in water | 4.3682 |
| Propylene Glycol | 3.9650 |
| Citric Acid | 2.7289 |
| Mono Potassium Phosphate | 2.0058 |
| Mono Calcium Phosphate | 1.8825 |
| Hydrolyzed Oat Flour | 1.6293 |
| Sucralose, 25% in water | 1.5194 |
| Lemon Flavor | 0.8696 |
| Yucca Extract Powder | 0.3365 |
| Potassium Sorbate | 0.1166 |
| Sodium Benzoate | 0.1166 |
| Stabilizer Gum, xanthan, guar and carrageenan | 0.1100 |
| Yellow #5 Granules | 0.0020 |
| Total | 100.0000 |

One part by volume of the concentrate prepared in this manner is then mixed with 5 parts by volume of carbonated water in a IMI Cornelius 2-Flavor FCB Dispenser. The diluted concentrate had a freezing point of 26° F. The resulting beverage had an overrun of 100% and a calorie content of about 58 calories per 12 ounce serving. Its viscosity was sufficient to permit stacking to overfill a serving container.

EXAMPLE 2

A sugar free lemonade beverage concentrate and frozen beverage are prepared as in Example 1, using the following formulation.

| Ingredient | % by Weight |
|---|---|
| Water, warm (140° F.) | 49.0350 |
| Glycerin | 22.9881 |
| Sorbitol, 70% in water | 6.1969 |
| Phosphoric Acid, 75% in water | 3.7245 |
| Propylene Glycol | 8.1959 |
| Citric Acid | 2.1989 |
| Mono Potassium Phosphate | 2.9385 |
| Mono Calcium Phosphate | 0.5537 |
| Oat Trim, Hydrolyzed Oat Flour | 1.3813 |
| Sucralose, powder | 0.2431 |
| Lemon Flavor | 1.0675 |
| Yucca Extract Powder | 0.3358 |
| Calcium Chloride | 0.0778 |
| Sodium Chloride | 0.0778 |
| Disodium Phosphate | 0.6087 |
| Potassium Sorbate | 0.1159 |
| Calcium Disodium EDTA | 0.0080 |
| Sodium Benzoate | 0.1159 |
| Stabilizer Colloids | 0.1339 |
| Yellow #5 Granules | 0.0020 |
| Total | 100.0000 |

One part by volume of the concentrate prepared in this manner is then mixed with 5 parts by volume of carbonated water in a IMI Cornelius 2-Flavor FCB Dispenser. The diluted concentrate had a freezing point of 26° F. The resulting beverage had an overrun of 100% and a calorie content of about 58 calories per 12 ounce serving. Its viscosity was sufficient to permit stacking to overfill a serving container.

EXAMPLE 3

A sugar free raspberry ice beverage concentrate and frozen beverage are prepared as in Example 1, using the following formulation.

| Ingredient | % by Weight |
|---|---|
| Water, warm (140° F.) | 52.3999 |
| Glycerine | 22.9880 |
| Sorbitol, 70% in water | 7.2680 |
| Propylene Glycol | 8.1959 |
| Malic Acid, FCC | 2.159 |
| Oat Trim, Hydrolyzed Oat Flour | 1.3813 |
| Mono Potassium Phosphate | 2.9385 |
| Mono Calcium Phosphate | 0.5537 |
| Sucralose, powder | 0.1848 |
| Disodium Phosphate | 0.6087 |
| Natural Raspberry Flavor | 0.4336 |
| Yucca Extract Powder | 0.3358 |
| Calcium Chloride | 0.778 |
| Sodium Chloride | 0.778 |
| Calcium Disodium EDTA | 0.0080 |
| Potassium Sorbate | 0.1159 |
| Sodium Benzoate | 0.1159 |
| Stabilizer Colloids | 0.1339 |
| FD&C Red #40 | 0.0226 |
| Total | 100.0000 |

One part by volume of the concentrate prepared in this manner is then mixed with 5 parts by volume of carbonated water in a IMI Cornelius 2-Flavor FCB Dispenser. The diluted concentrate had a freezing point of 26° F. The resulting beverage had an overrun of 100% and a calorie content of about 58 calories per 12 ounce serving. Its viscosity was sufficient to permit stacking to overfill a serving container.

EXAMPLE 4

A sugar free raspberry tea beverage concentrate and frozen beverage are prepared as in Example 1, using the following formulation.

| Ingredient | % by Weight |
|---|---|
| Water, warm (140° F.) | 50.9088 |
| Glycerin | 22.9880 |
| Sorbitol, 70% in water | 6.1970 |
| Propylene Glycol | 8.1960 |
| Malic Acid | 2.1699 |
| Mono Potassium Phosphate | 2.9385 |
| Mono Calcium Phosphate | 0.5537 |
| Oat Trim, Hydrolyzed Oat Flour | 1.3813 |
| Sucralose, powder | 0.2431 |
| Instant Tea | 2.3789 |
| Natural Raspberry Flavor | 0.4710 |
| Yucca Extract Powder | 0.3358 |
| Calcium Chloride | 0.0778 |
| Sodium Chloride | 0.0778 |
| Disodium Phosphate | 0.6087 |
| Caramel Color | 0.0600 |
| Calcium Disodium EDTA | 0.0080 |

-continued

| Ingredient | % by Weight |
| --- | --- |
| Potassium Sorbate | 0.1159 |
| Sodium Benzoate | 0.1159 |
| Stabilizer Colloids | 0.1339 |
| FD&C Red #40 | 0.0400 |
| Total | 100.0000 |

One part by volume of the concentrate prepared in this manner is then mixed with 5 parts by volume of carbonated water in a IMI Cornelius 2-Flavor FCB Dispenser. The diluted concentrate had a freezing point of 26° F. The resulting beverage had an overrun of 100% and a calorie content of about 58 calories per 12 ounce serving. Its viscosity was sufficient to permit stacking to overfill a serving container.

EXAMPLE 5

A sugar free fruit punch beverage concentrate and frozen beverage are prepared as in Example 1, using the following formulation.

| Ingredient | % by Weight |
| --- | --- |
| Water, warm (140° F.) | 51.2843 |
| Glycerin | 22.9881 |
| Sorbitol, 70% in water | 6.1970 |
| Propylene Glycol | 8.1964 |
| Malic Acid | 4.0600 |
| Mono Potassium Phosphate | 2.9387 |
| Mono Calcium Phosphate | 0.5537 |
| Oat Trim, Hydrolyzed Oat Flour | 1.3813 |
| Sucralose, powder | 0.2430 |
| Natural Fruit Punch Flavor | 0.6363 |
| Yucca Extract Powder | 0.3357 |
| Calcium Chloride | 0.0777 |
| Sodium Chloride | 0.0777 |
| Disodium Phosphate | 0.6087 |
| FD&C Red #40 | 0.0477 |
| Calcium Disodium EDTA | 0.0080 |
| Potassium Sorbate | 0.1159 |
| Sodium Benzoate | 0.1159 |
| Stabilizer Colloids | 0.1339 |
| Total | 100.0000 |

One part by volume of the concentrate prepared in this manner is then mixed with 5 parts by volume of carbonated water in a IMI Cornelius 2-Flavor FCB Dispenser. The diluted concentrate had a freezing point of 26° F. The resulting beverage had an overrun of 100% and a calorie content of about 58 calories per 12 ounce serving. Its viscosity was sufficient to permit stacking to overfill a serving container.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A concentrate for dilution with water or carbonated water, freezing and whipping to prepare a low-calorie whipped, frozen beverage, comprising:
    water; a polyol, flavor, acidulent, buffering salts, and high-intensity sweetener.

2. A concentrate according to claim 1, wherein the concentrate is formulated for mixing to form a beverage having an overrun of from 50 to 150%.

3. A concentrate according to claim 2, wherein the concentrate is formulated for mixing to form a beverage having an overrun of 100%.

4. A concentrate according to claim 1, wherein the concentrate has a total salt content of from 1 to 10%.

5. A concentrate according to claim 1, wherein the concentrate is formulated for mixing to form a beverage having a suitably depressed freezing point of from about 24 to 26° F.

6. A concentrate according to claim 5, wherein the concentrate is formulated for mixing to form a beverage having a suitably depressed freezing point of about 25° F.

7. A concentrate according to claim 1, comprising from about 20 to about 50% by weight of a combination of polyols.

8. A concentrate according to claim 1, wherein the combination of polyols comprises sorbitol.

9. A concentrate according to claim 1, wherein the combination of polyols comprises from about 25 to about 40% of polyols, including from about 5 to about 10% sorbitol, and has a total salt content of from 2 to 5%.

10. A concentrate according to claim 1, wherein the concentrate is formulated for mixing with from about 3 to 6 parts water for each part of concentrate on a volume basis.

11. A concentrate according to claim 1, wherein the acidulent comprises phosphoric acid and/or a member selected from the group consisting of adipic acid, citric acid, fumaric acid, lactic acid, malic acid, tartaric acid, and a mixture of at least two acids.

12. A concentrate for dilution with water or carbonated water, freezing and whipping to prepare a low-calorie whipped, frozen beverage formulated to have a freezing point of from about 24 to 26° F. for mixing to form a beverage having an overrun of from 50 to 150% and less than 100 calories per 12 ounce serving by volume, comprising:
    water; a polyol, flavor, acidulent, buffering salts, and high-intensity sweetener.

13. A concentrate according to claim 12, comprising from about 20 to about 50% by weight of a combination of polyols and from about 1 to 10% total salts.

14. A concentrate according to claim 13, wherein the combination of polyols comprises sorbitol.

15. A concentrate according to claim 14, wherein the combination of polyols comprises from about 25 to about 40% of polyols including from about 5 to about 10% sorbitol.

16. A concentrate according to claim 12, wherein the acidulent comprises phosphoric acid and/or a member selected from the group consisting of adipic acid, citric acid, fumaric acid, lactic acid, malic acid, tartaric acid, and a mixture of at least two acids.

17. A process for preparing a low-calorie whipped, frozen beverage, comprising:
    mixing a concentrate comprising water, a polyol, flavor, acidulent, buffering salts, and high-intensity sweetener, with water or carbonated water;
    freezing the mixture of water and concentrate; and whipping the mixture to prepare an aerated, frozen slush beverage.

18. A process according to claim 17 wherein, the beverage is formulated to have a freezing point of from about 24 to 26° F. and has an overrun of from 50 to 150% and less than 100 calories per 12 ounce serving by volume.

19. A process according to claim 17 wherein, the concentrate includes from about 25 to about 40% of polyols of a combination of polyols, comprising from about 5 to about 10% sorbitol, and has a total salt content of from about 1 to 10%.

20. A process according to claim 17 wherein, the concentrate includes an acidulent comprising phosphoric acid and/or a member selected from the group consisting of adipic acid, citric acid, fumaric acid, lactic acid, malic acid, tartaric acid, and a mixture of at least two acids.

* * * * *